(12) United States Patent
Reitz et al.

(10) Patent No.: US 9,152,360 B1
(45) Date of Patent: Oct. 6, 2015

(54) METHOD AND SYSTEM FOR SECURE BRANCH PRINTING

(71) Applicant: Xerox Corporation, Norwalk, CT (US)

(72) Inventors: Jeremy L. Reitz, Marion, NY (US); Emil Macarie, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/504,555

(22) Filed: Oct. 2, 2014

(51) Int. Cl.
*G06F 15/00* (2006.01)
*G06F 3/12* (2006.01)
*G06K 1/00* (2006.01)

(52) U.S. Cl.
CPC ............ *G06F 3/1222* (2013.01); *G06F 3/1204* (2013.01); *G06F 3/1231* (2013.01); *G06F 3/1236* (2013.01); *G06F 3/1238* (2013.01); *G06F 3/1287* (2013.01); *G06F 3/1288* (2013.01); *G06F 3/1292* (2013.01)

(58) Field of Classification Search
CPC ... G06F 3/1222; G06F 3/1204; G06F 3/1236; G06F 3/1238; G06F 3/1288; G06F 3/1292; G06F 3/1231; G06F 3/1287
USPC ......................................... 358/1.15, 1.14, 1.1
See application file for complete search history.

(56) References Cited

U.S. PATENT DOCUMENTS

| 7,124,113 | B1 | 10/2006 | Fairclough et al. |
| 7,463,378 | B2* | 12/2008 | Williams et al. ............. 358/1.15 |
| 7,552,202 | B2* | 6/2009 | Brown et al. ................. 709/220 |
| 8,057,032 | B2 | 11/2011 | Lapstun et al. |
| 8,095,787 | B2 | 1/2012 | Kanekar et al. |
| 8,154,752 | B2* | 4/2012 | Shaw et al. ................... 358/1.15 |
| 8,271,776 | B2 | 9/2012 | Revel et al. |
| 8,593,677 | B2 | 11/2013 | Nishimi et al. |
| 8,639,813 | B2 | 1/2014 | Suganthi et al. |
| 8,782,393 | B1 | 7/2014 | Rothstein et al. |
| 2003/0067624 | A1 | 4/2003 | Anderson et al. |
| 2003/0074261 | A1 | 4/2003 | Norris |
| 2012/0113458 | A1 | 5/2012 | Benedek |
| 2012/0127512 | A1 | 5/2012 | Kay et al. |
| 2014/0047504 | A1* | 2/2014 | Tsuchitoi ........................... 726/1 |

FOREIGN PATENT DOCUMENTS

ER          1 460 529 A3    4/2007

* cited by examiner

*Primary Examiner* — Douglas Tran
(74) *Attorney, Agent, or Firm* — Kermit D. Lopez; Luis M. Ortiz; Ortiz & Lopez, PLLC

(57) ABSTRACT

Methods and systems for branch printing. A secure print path to a remote printer can be configured from a device from which a print job originates. The secure print path is configured to include secure device communications and secure job spooling. The print job can be routed via port forwarding to the remote printer for rendering (e.g., printing) at the remote printer. Configuring the secure print path can involve employing an SNMP (Simple Network Management Protocol) and an IPP (Internet Printing Protocol) over an SSL (Secure Socket Layer) to train a print server to determine the optimal pooling path for the secure print path.

20 Claims, 3 Drawing Sheets

METHOD AND SYSTEM FOR SECURE BRANCH PRINTING

FIELD OF THE INVENTION

Embodiments are generally related to remote or branch printing. Embodiments are additionally related to the configuration of secure print paths to remote print locations.

BACKGROUND

As computers become smaller and more portable, it has become desirable to have increased ability to print to different printers from a portable computer. For example, with handheld computers approaching the size of a mobile phone, these computers and their users may often be in the vicinity of a printer that the user would like to print to, but cannot easily access. This may occur anytime the user is located away from their residence or typical workplace. One example may be the case of a user who has traveled to a different state to attend a conference and wishes to print to a printer at her hotel as well as to a printer at the conference center.

Another example involves branch printing, which is a form of printing in which a user at one location (e.g., a company headquarters) desires to print documents at a remote or branch location. Electronically sending print jobs to satellite or branch locations is a challenging task without additional support infrastructure at each location. Because such remote locations do not offer an IT footprint, it is often the requirement of the customer to enable the printing service without additional IT assets or infrastructure, which requires expensive and time-consuming maintenance.

An ideal candidate for branch printing is a business or organization that has many branches, but no centralized network to manage the print assets in each location, with each location containing a single print resource. This is seen in many places such as, for example, hospitality businesses/hotels, Internet cafes, air travel, and other businesses where small branches or satellite locations may be present.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide a method and system for secure branch printing.

It is another aspect of the disclosed embodiments to provide for the configuration of a secure print path for use in branch printing.

It is yet another aspect of the disclosed embodiments to provide for a print path with secure device communications and secure job spooling.

It is still another aspect of the disclosed embodiments to provide the delivery of a secure print path to remote locations, which requires no on-site footprint of additional software or hardware at each location.

The aforementioned aspects and other objectives and advantages can now be achieved as described herein. Methods and systems are disclosed for branch printing. Security for a secure print path, a device and secure job spooling can be determined. A secure print path to a remote printer can be configured to include secure device communication and secure job spooling. The print job can be routed via port forwarding from, for example, a mobile device such as a Smartphone, "Pad" computing device, or a laptop computer to the remote printer for rendering (e.g., printing) of the print job at the remote printer. Configuring the secure print path can involve employing an SNMP (Simple Network Management Protocol) and an IPP (Internet Printing Protocol) over an SSL (Secure Socket Layer) to train a print server to determine the optimal pooling path for the secure print path.

If the remote location is not associated with a static IP address, a DONS (Distributed Domain Name Services) can be employed for determining the dynamic IP of the remote printer. In some embodiments, a secure print passcode can be utilized, which when activated allows for release of the print job once the print job arrives at the remote printer via the secure print path.

The disclosed approach thus allows a print job to be routed to a printer at, for example, a branch location of a company or organization in a secure manner using a combination of Distributed Domain Naming Service (DONS) for discovering the dynamic Internet Protocol (IP) address of Printers, Internet Printing Protocol (IPP) over Secure Socket Layer (SSL) for secure transport, and Simple Network Management Protocol (SNMP) for notifications.

Benefits of this approach include, for example, enhanced user productivity and simplicity in operation with respect to the mobile worker, because any print job submitted by the mobile worker is automatically routed to the branch location where the worker is currently located. In addition, there is no need for Information Technology (IT) support to manually provide connectivity at the branch location. Security benefits can result from the routing of jobs over a secure channel and features that permit the job to be released upon supply of, for example, a secure Personal Identification Number (PIN) or other passcode or identifier (e.g., biometric identification) at the remote printer.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 1:
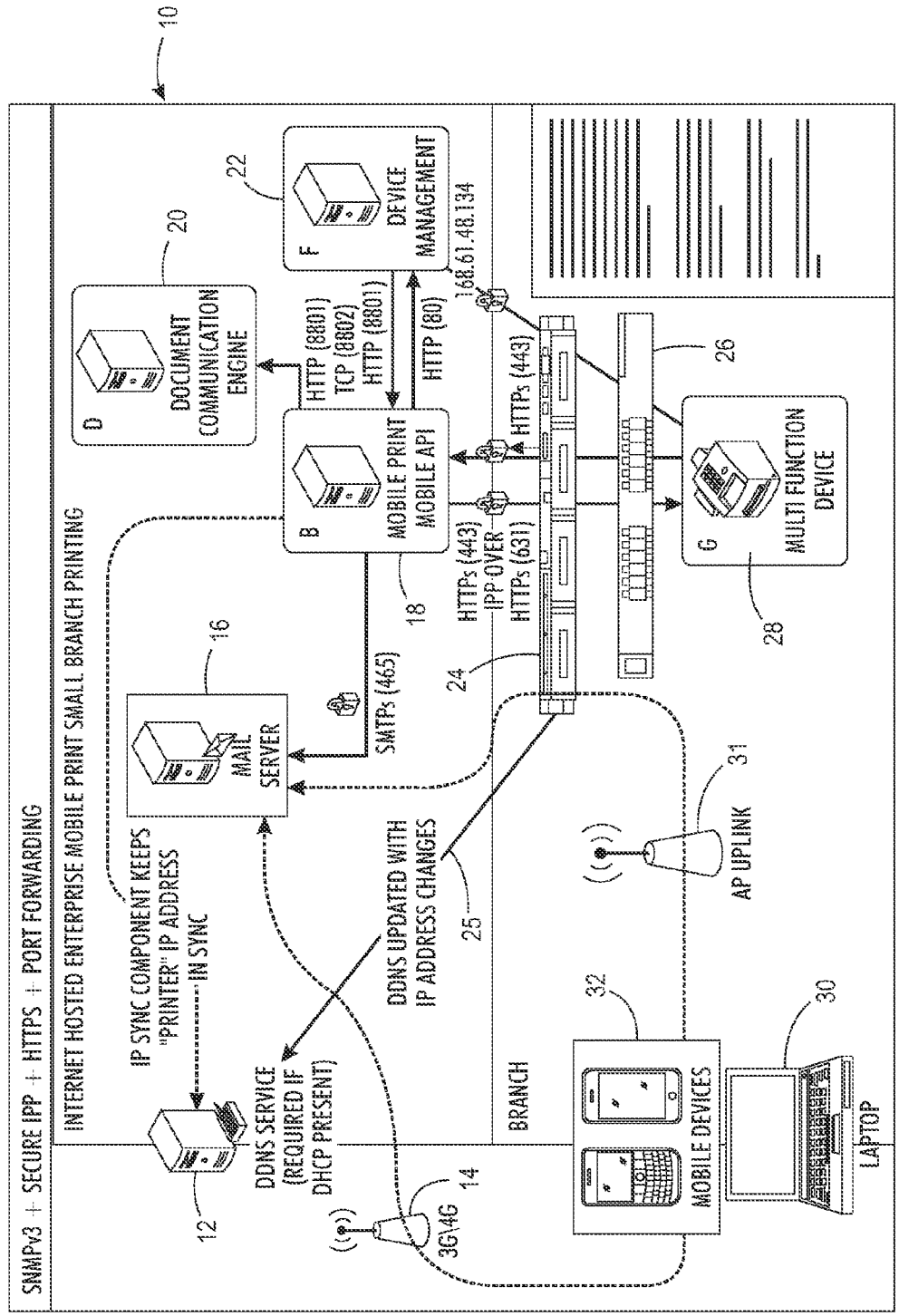
FIG. 1 illustrates a schematic diagram of a system for branch printing, in accordance with a preferred embodiment.

FIG. 1 illustrates a schematic diagram of a system 10 for branch printing, in accordance with a preferred embodiment. System 10 can implement Internet-hosted enterprise mobile print small branch printing operations and can further include a mail server 16, which communicates with one or more mobile device(s) 32 (e.g., Smartphone, "Pad" or tablet computing device) or other electronic devices such as, for example, a laptop computer 30. System 10 further includes the use of a device manager 22, a mobile print API (Application Programming Interface) 18, and a document conversion engine 20. The mobile print API 18 can further communicate with a server 12 (e.g., DDNS service, which may be required if DHCP is present). Note that the term API or Application Programming Interface as utilized herein specifies a software component in terms of its operations, along with their inputs and outputs and underlying types. A main purpose of an API is to define a set of functionalities that are independent of their respective implementation, allowing both definition and implementation to vary without compromising each other.

A remote printer 28 is further shown in FIG. 1. It can be appreciated that the remote printer 28 is located at a branch location remote from devices such as devices 32, 30, etc. The mobile devices 32 and/or the electronic device 30 can communicate with the mail server 16 via, for example, 3G/4G cellular communications 14 and/or via a wireless uplink 31. An IP synch component 24 and router 26 communicate with one another and with the remote printer 28 and the mobile print API 18 and the device manager 22. The IP synch component 24 also communicates with server 12 and as indicated by arrow 25, the DONS service provided by server 12 is updated with IP address changes as needed.

Note that although a printer 28 (e.g., a multi-function device) is shown in FIG. 1, it can be appreciated that multiple remote printers can be implemented in the context of system 10. In the case of a single printer, port forwarding may be required. That is, all traffic coming from the hosted mobile print service would be forwarded to the printer on-site. The use of a DDNS service (e.g., server 12) and the IP sync component 24 may be necessary if the customer does not have static IP addresses from their ISP (Internet Service Provider). In the case of multiple printer sites, each printer can be provided with an external static IP. Then, IP filtering on the printer can be configured to only receive traffic from, for example, mobile print API 18 and servers in the "cloud." Note that the term "cloud" generally refers to "cloud computing" and its various implementations and incarnations. Cloud computing generally involves the practice of using a network of remote servers hosted on the Internet to store, manage, and process data, rather than a local server or a personal computer.

System 10 allows for the creation of a secure print path to printers at remote locations, requiring zero on-site footprint of additional software or hardware at each location. The print path uses a combination of, for example, SNMP (e.g., SNMPv3) and IPP over SSL to secure the device communication and job spooling. Port forwarding can be used to route the traffic to the printer on-site and DDNS can be employed for branch locations that do not have static IP addresses. Additionally, the secure release of the print jobs could be optionally required by adding a secure print (e.g., PIN) or passcode to release the print job once it arrives at the requested print device such as, for example, device 28 shown in FIG. 1.

System 10 allows a print job to be routed to a printer at, for example, a company's branch location securely using a combination of Distributed Domain Naming Service (DDNS) for discovering the dynamic Internet Protocol (IP) address of Printers, Internet Printing Protocol (IPP) over Secure Socket Layer (SSL) for secure transport, and Simple Network Management Protocol (SNMP) for notifications. With system 10, there is no need for Information Technology (IT) support to manually provide connectivity at the branch location. Security benefits of system 10 include the routing of jobs over a secure channel and a feature that allows the job will be released upon the supply of, for example, a secure Personal Identification Number (PIN) at the printer.

Figure 2:
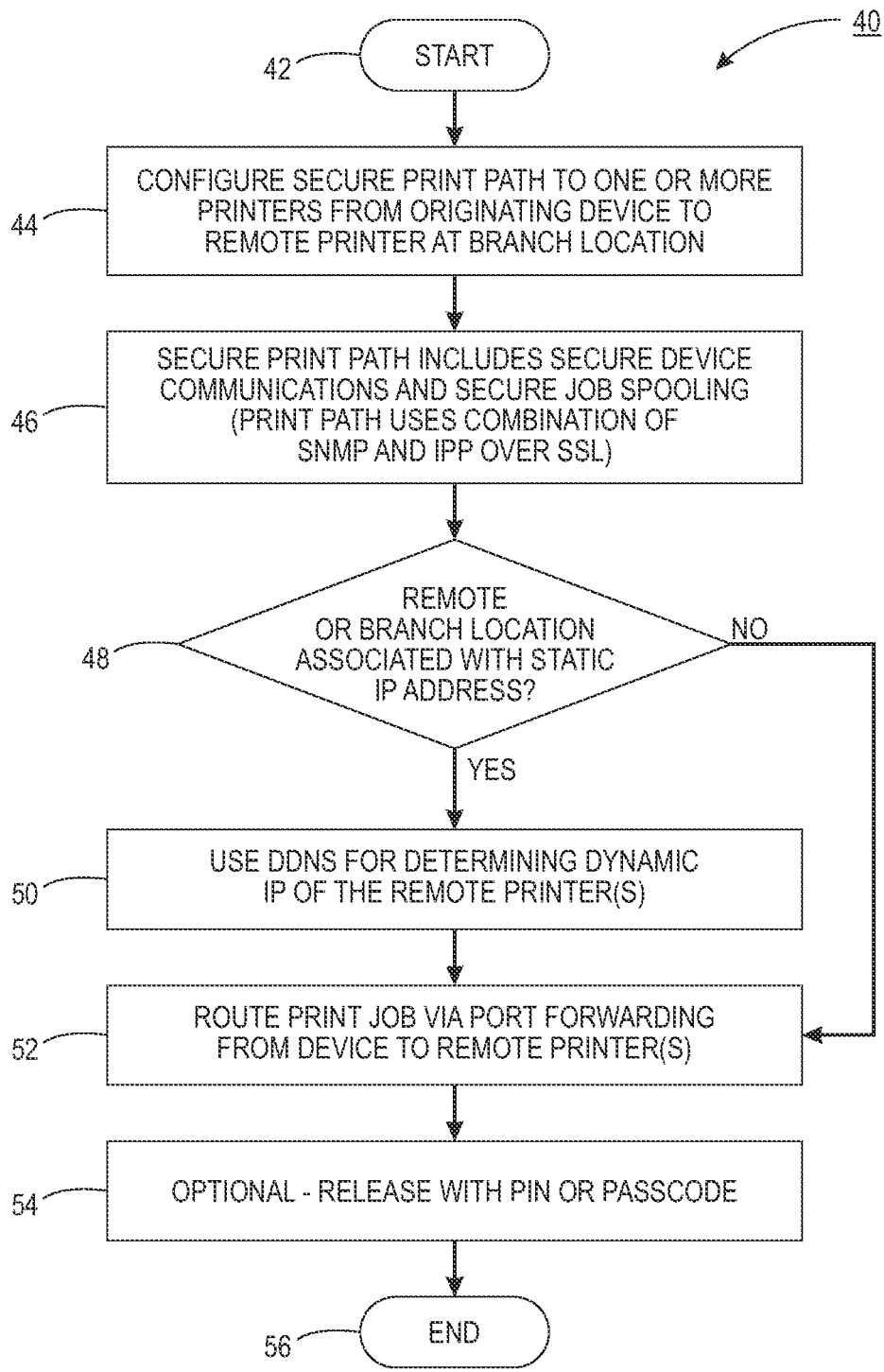
FIG. 2 illustrates a high-level flow chart of operations depicting logical operational steps of a method for branch printing, in accordance with an alternative embodiment.

FIG. 2 illustrates a high-level flow chart of operations depicting logical operational steps of a method for branch printing, in accordance with an alternative embodiment. As indicated at block 42, the process can be initiated. As shown next at block 44, a secure print path can be configured to one or more printers from an originating device to a remote printer(s) located at a branch location. The secure path includes secure device communications and secure job spooling, as shown at block 46. That is, the secure print path can be configured to use a combination of SNMP and IPP over SSL.

Next, as shown at block 48, a test can be performed to determine if the remote or branch location is associated with a static IP address. If so, then DDNS is used for determining the dynamic IP of the remote printer(s), as shown at block 50. If not, then the operation depicted at block 52 can be processed, wherein the print job is routed via port forwarding from the original device to the remote printer(s). Finally, as indicated at block 54, an optional operation can be implemented, wherein the print job is released when a PIN or passcode is provided. The process then terminates at shown at block 56.

As can be appreciated by one skilled in the art, embodiments can be implemented in the context of a method, data processing system, or computer program product. Accordingly, embodiments may take the form of an entire hardware embodiment, an entire software embodiment or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in an object oriented programming language (e.g., Java, C++, etc.). The computer program code, however, for carrying out operations of particular embodiments may also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a users computer through a local area network (LAN) or a wide area network (WAN), wireless data network e.g., WiFi, Wimax, 802.xx, and cellular network or the connection may be made to an external computer via most third party supported networks (for example, through the Internet utilizing an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 3:
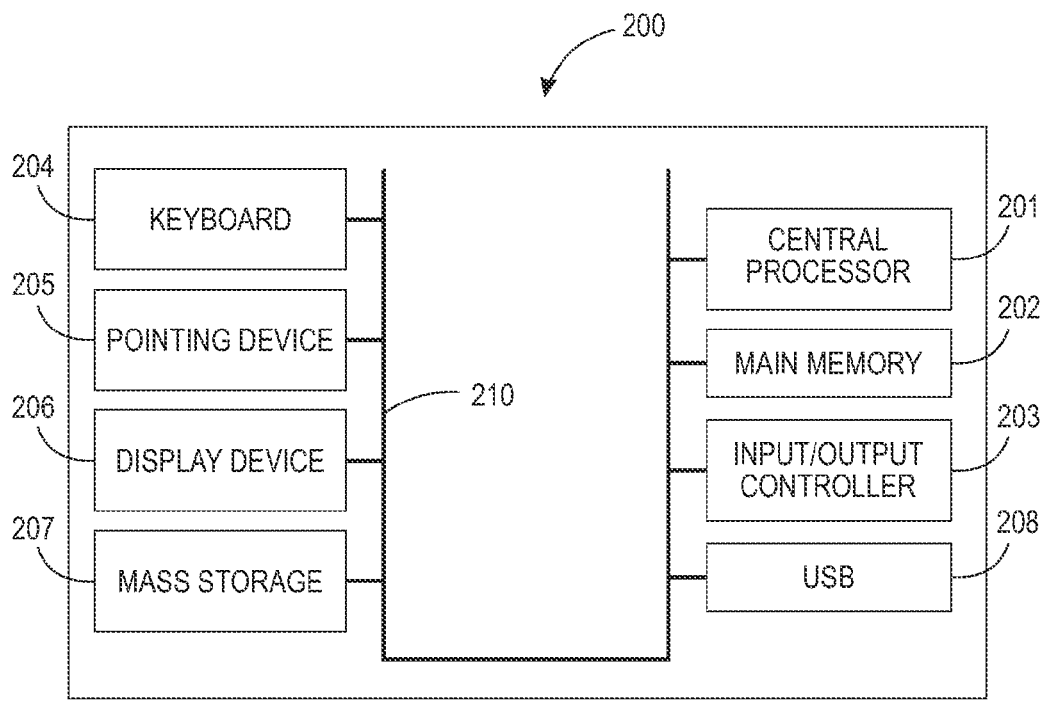
FIGS. 3-4 are provided as exemplary diagrams of data-processing environments in which some embodiments may be implemented.
Figure 4:
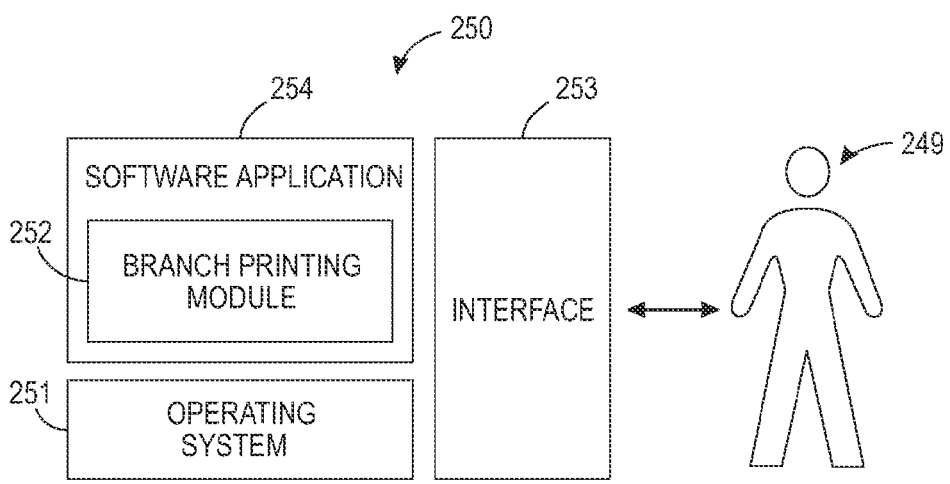

FIGS. 3-4 are provided as exemplary diagrams of data-processing environments in which embodiments may be implemented. It should be appreciated that FIGS. 3-4 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 3, some embodiments may be implemented in the context of a data-processing system 200 that includes, for example, a central processor 201, a main memory 202, an input/output controller 203, a keyboard 204, an input device 205 (e.g., a pointing device, such as a mouse, track ball, stylus, etc.), a display device 206, a mass storage 207 (e.g., a hard disk), and a USB (Universal Serial Bus) 208 peripheral connection. As illustrated, the various components of data-processing system 200 can communicate electronically through a system bus 210 or similar architecture. The system bus 210 may be, for example, a subsystem that transfers data between, for example, computer components within data-processing system 200 or to and from other data-processing devices, components, computers, etc.

FIG. 4 illustrates a computer software system 250 for directing the operation of the data-processing system 200 depicted in FIG. 3. Software application 254, stored in main memory 202 and on mass storage 207, generally includes a kernel or operating system 251 and a shell or interface 253. One or more application programs, such as software application 254, may be "loaded" (i.e., transferred from mass storage 207 into the main memory 202) for execution by the data-processing system 200. The data-processing system 200 receives user commands and data through user interface 253; these inputs may then be acted upon by the data-processing system 200 in accordance with instructions from operating system 251 and/or software application 254.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application. An example of a "module" is the branch printing module 252 shown in FIG. 4, which may include instructions for performing the various branch printing operations and features, such as, for example, the instructions shown and described herein with respect to blocks 42, 44, 46, 48, 50, 52, 54 of method 40 shown in the embodiment of FIG. 2 and/or for example, the various blocks and components 12, 16, 14, 18, 20, 22, 24, 25, 26, 28, 30, 31, etc., of system 10 of FIG. 1.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

The interface 253, which is preferably a graphical user interface (GUI), also serves to display results, whereupon the user may supply additional inputs or terminate the session. In some embodiments, interface 253 may serve as, for example, interface 120 discussed earlier herein. In an embodiment, operating system 251 and interface 253 can be implemented in the context of a "Windows" system. It can be appreciated, of course, that other types of systems are possible. For example, rather than a traditional "Windows" system, other operation systems such as, for example, Linux may also be employed with respect to operating system 251 and interface 253. The software application 254 can include a module 252 that can, for example, function or actually be the branch printing module. Software application 254, on the other hand, can include instructions, such as the various operations described herein with respect to the various components and modules described herein, such as, for example, method 40 depicted in FIG. 2 and/or various components such as the mobile API 18 and the document conversion engine 20 shown in FIG. 1.

FIGS. 3-4 are thus intended as examples and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like and including mobile operating systems, such as Android, Apple, etc., for mobile devices.

Based on the foregoing, it can be appreciated that a number of advantages can accrue from implementation of the disclosed embodiments. For example, the disclosed embodiments can be implemented in the context of existing mobile print solutions. Additionally, the ability to train a print server to determine the optical spooling path based on comparing throughput on each available port and protocol as shown in FIG. 1. Advantages of this approach are that it requires that no point-to-point integration be implemented on printers and supports different types of hardware and equipment, which support IPP over SSL and SNMPv3. This approach also offers managed print services as well as mobile printing to the satellite or branch locations. The disclosed approach is applicable to all branch locations with minimal central IT management.

It can also be appreciated based on the foregoing that a number of embodiments, preferred and alternative are disclosed herein. For example, in one embodiment, a method for branch printing can be implemented. Such a method can include the steps or logical operations of configuring a secure print path to at least one remote printer located remote from a device from which a print job originates, the secure print path configured to include secure device communication and secure job spooling; and routing the print job via port forwarding from the device to the at least one remote printer for rendering of the print job at the at least one remote printer.

In some embodiments, the secure print path can employ an SNMP (Simple Network Management Protocol). In another embodiment, the secure print path can employ an IPP (Internet Printing Protocol). In yet another embodiment, the secure print path can employ an IPP (Internet Printing Protocol) over an SSL (Secure Socket Layer).

In another embodiment, configuring the secure print path can further involve employing an SNMP (Simple Network Management Protocol) and an IPP (Internet Printing Protocol) over an SSL (Secure Socket Layer) to train a print server to determine an optimal pooling path for the secure print path. In yet another embodiment, a step or logical operation can be provided for employing a DDNS (Distributed Domain Naming Service) for determining a dynamic IP of the at least one remote printer, if the remote location is not associated with a static IP address. In yet another embodiment, a step or logical operation can be provided for employing a DDNS (Distributed Domain Naming Service) for determining a dynamic IP of the at least one remote printer, if the remote location is not associated with a static IP address. In yet another embodiment, a step or logical operation can be provided for providing a secure print passcode that when activated allows for release of the print job once the print job arrives at the at least one remote printer via the secure print path.

In another embodiment, a system for branch printing can be provided. Such a system can include one or more processor and a memory comprising instructions stored therein, which when executed by the one or more processors, cause the one or more processors to perform operations including, for example, configuring a secure print path to at least one remote printer located remote from a device from which a print job originates, the secure print path configured to include secure device communication and secure job spooling, and routing the print job via port forwarding from the device to the at least one remote printer for rendering of the print job at the at least one remote printer.

In yet another embodiment, a system for branch printing can be implemented. Such a system can include, for example, at least one remote printer that communicates electronically with a network, wherein a secure print path is configured to the at least one remote printer located remote from a device from which a print job originates, the secure print path configured to include secure device communication and secure job spooling, and wherein the print job is routed via port forwarding and through the network from the device to the at least one remote printer for rendering of the print job at the at least one remote printer.

It will be appreciated that variations of the above-disclosed and other features and functions, or alternatives thereof, may be desirably combined into many other different systems or applications. It can also be appreciated that various presently unforeseen or unanticipated alternatives, modifications, variations or improvements therein may be subsequently made by those skilled in the art which are also intended to be encompassed by the following claims.

The invention claimed is:

1. A method for branch printing, said method comprising:
   determining security for a secure print path, a device and a secure job spooling;
   configuring said secure print path to at least one remote printer located remote from said device from which a print job originates, said secure print path configured to include secure device communication and said secure job spooling; and
   routing said print job via port forwarding from said device to said at least one remote printer for rendering of said print job at said at least one remote printer.

2. The method of claim 1 wherein said secure print path employs SNMP (Simple Network Management Protocol).

3. The method of claim 1 wherein said secure print path employs IPP (Internet Printing Protocol).

4. The method of claim 1 wherein said secure print path employs an IPP (Internet Printing Protocol) over an SSL (Secure Socket Layer).

5. The method of claim 1 wherein configuring said secure print path further comprises employing an SNMP (Simple Network Management Protocol) and an IPP (Internet Printing Protocol) over an SSL (Secure Socket Layer) to train a print server to determine an optimal pooling path for said secure print path.

6. The method of claim 5 further comprising employing a DDNS (Distributed Domain Naming Service) for determining a dynamic IP of said at least one remote printer, if said remote location is not associated with a static IP address.

7. The method of claim 1 further comprising employing a DDNS (Distributed Domain Naming Service) for determining a dynamic IP of said at least one remote printer, if said remote location is not associated with a static IP address.

8. The method of claim 1 further comprising providing a secure print passcode that when activated allows for release of said print job once said print job arrives at said at least one remote printer via said secure print path.

9. A system for branch printing, said system comprising:
   at least one processor; and
   memory comprising instructions stored therein, which when executed by said one or more processors, cause said at least one processor to perform operations comprising:
   determining security for a secure print path, a device and a secure job spooling;
   configuring said secure print path to at least one remote printer located remote from said device from which a print job originates, said secure print path configured to include secure device communication and said secure job spooling; and
   routing said print job via port forwarding from said device to said at least one remote printer for rendering of said print job at said at least one remote printer.

10. The system of claim 9 wherein said secure print path employs SNMP (Simple Network Management Protocol).

11. The system of claim 9 wherein said secure print path employs IPP (Internet Printing Protocol).

12. The system of claim 9 wherein said secure print path employs an IPP (Internet Printing Protocol) over an SSL (Secure Socket Layer).

13. The system of claim 9 wherein configuring said secure print path further comprises employing an SNMP (Simple Network Management Protocol) and an IPP (Internet Printing Protocol) over an SSL (Secure Socket Layer) to train a print server to determine an optimal pooling path for said secure print path.

14. The system of claim 12 wherein said operation further comprise employing a DDNS (Distributed Domain Naming Service) for determining a dynamic IP of said at least one remote printer, if said remote location is not associated with a static IP address.

15. The system of claim 9 wherein said operations further comprise employing a DDNS (Distributed Domain Naming Service) for determining a dynamic IP of said at least one remote printer, if said remote location is not associated with a static IP address.

16. The system of claim 9 wherein said operations further comprise providing a secure print passcode that when activated allows for release of said print job once said print job arrives at said at least one remote printer via said secure print path.

17. A system for branch printing, said system comprising:
   at least one remote printer that communicates electronically with a network,
   wherein security is determined with respect to a secure print path a device and a secure job spooling, and
   wherein said secure print path is configured to said at least one remote printer located remote from said device from which a print job originates, said secure print path configured to include secure device communication and said secure job spooling; and
   wherein said print job is routed via port forwarding and through said network from said device to said at least one remote printer for rendering of said print job at said at least one remote printer.

18. The system of claim 17 wherein said secure print path employs SNMP (Simple Network Management Protocol).

19. The system of claim 17 wherein said secure print path employs IPP (Internet Printing Protocol) and/or wherein said secure print path employs an IPP (Internet Printing Protocol) over an SSL (Secure Socket Layer).

20. The system of claim 17 wherein said secure print path is configured by employing an SNMP (Simple Network Management Protocol) and an IPP (Internet Printing Protocol) over an SSL (Secure Socket Layer) to train a print server to determine an optimal pooling path for said secure print path.

* * * * *